(12) United States Patent
Swope et al.

(10) Patent No.: US 12,462,119 B2
(45) Date of Patent: Nov. 4, 2025

(54) SYSTEMS AND METHODS FOR TAG POLLING

(71) Applicant: ZEBRA TECHNOLOGIES CORPORATION, Lincolnshire, IL (US)

(72) Inventors: Charles Burton Swope, Coral Springs, FL (US); Stanko Jelavic, Davie, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 173 days.

(21) Appl. No.: 18/226,649

(22) Filed: Jul. 26, 2023

(65) Prior Publication Data
US 2025/0036890 A1    Jan. 30, 2025

(51) Int. Cl.
G06K 7/10 (2006.01)
G06K 19/077 (2006.01)

(52) U.S. Cl.
CPC ... *G06K 7/10099* (2013.01); *G06K 19/07758* (2013.01)

(58) Field of Classification Search
None
See application file for complete search history.

(56) References Cited

U.S. PATENT DOCUMENTS

| | | | |
|---|---|---|---|
| 10,959,293 B2 * | 3/2021 | Rom | H04B 17/318 |
| 2006/0290519 A1 * | 12/2006 | Boate | G07C 9/28 |
| | | | 340/573.4 |
| 2008/0100447 A1 * | 5/2008 | Powell | G06K 7/0008 |
| | | | 340/572.2 |
| 2016/0100521 A1 * | 4/2016 | Halloran | G01S 17/06 |
| | | | 180/169 |

* cited by examiner

Primary Examiner — John F Mortell

(57) ABSTRACT

Systems and methods for system for tag polling are disclosed herein. An example system includes: a tag associated with an asset; an anchor configured to poll the tag at a first transmission rate and determine an angle-of-arrival (AOA) based on signal data received from the tag; and a server communicatively coupled with the anchor. The server may be configured to: receive first information corresponding to the tag, the first information being indicative of one or more first instances where the anchor polls the tag at a second transmission rate that is different from the first transmission rate. The server may further be configured to receive, from the anchor, a tag listing that includes the tag, determine a first instance occurrence for the tag based on the first information, and transmit a request to the anchor that causes the anchor to poll the tag at the second transmission rate.

20 Claims, 4 Drawing Sheets

SYSTEMS AND METHODS FOR TAG POLLING

BACKGROUND

Digital technology is utilized in industrial networks for locationing services. More specifically, location data insight is a relevant component of entities seeking to track locations and statuses of their assets, enhance the productivity of their workers, and to generally optimize workflows. As such, development of devices that reliably provide cost-effective, proximity-based asset visibility solutions, and that are simultaneously convenient to deploy, simple to manage, and secure are a topic of great interest in the field of industrial networking.

However, conventional locationing devices suffer from several drawbacks that prevent them from providing such reliable, effective, and secure locationing services. Namely, many conventional locationing devices operate as Angle-of-arrival (AOA) devices configured to determine elevation and azimuth angles of tags based on one of several conventional AOA algorithms. Such conventional algorithms typically rely on a peak search to determine the angle(s) for each tag. However, these conventional devices and algorithms frequently yield the wrong peak, and hence, the wrong angles. Efforts to minimize these issues by, for example, increasing the sampling rate/frequency of tags similarly frustrate locationing efforts by draining the tag batteries to levels insufficient to provide long-term locationing (e.g., over weeks/months). Consequently, conventional locationing devices suffer from numerous issues that minimize the efficiency and effectiveness of the overall locationing system to locate individual tags and the corresponding assets.

Thus, there is a need for systems and methods for tag polling that allows for fast, efficient, secure, and reliable data transmission within a locationing system.

SUMMARY

In an embodiment, the present invention is a system for tag polling. The system may comprise: a tag associated with an asset; an anchor configured to poll the tag at a first transmission rate and determine an angle-of-arrival (AOA) based on signal data received from the tag; and a server communicatively coupled with the anchor, the server being configured to: receive first information corresponding to the tag, the first information being indicative of one or more first instances where the anchor polls the tag at a second transmission rate that is different from the first transmission rate, receive, from the anchor, a tag listing that includes the tag, determine a first instance occurrence for the tag based on the first information, and transmit a request to the anchor that causes the anchor to poll the tag at the second transmission rate.

In a variation of this embodiment, the anchor may be further configured to: receive the request; poll the tag at the second transmission rate; determine the AOA based on a first set of signal data received from the tag at the second transmission rate; and transmit the AOA to the server.

In another variation of this embodiment, the tag may be configured to: receive a polling request from the anchor indicating the second transmission rate; transmit a first set of data packets to the anchor at the second transmission rate; and adjust a data transmission rate from the second transmission rate to the first transmission rate in accordance with at least one of: (i) a timer exceeding a time threshold or (ii) receipt of a subsequent polling request indicating the first transmission rate.

In yet another variation of this embodiment, the AOA may include a Bluetooth low energy (BLE) continuous tone extension (CTE) data packet.

In still another variation of this embodiment, the anchor may be further configured to: poll proximate tags within a threshold distance from the anchor at the first transmission rate to receive a respective set of signal data from each proximate tag; and update the tag listing based on the respective set of signal data received from the proximate tags.

In yet another variation of this embodiment, the second transmission rate may be higher than the first transmission rate.

In still another variation of this embodiment, the first information may include at least one of: (i) a movement threshold, (ii) a scheduled first instance, or (iii) a position threshold.

In yet another variation of this embodiment, the request may include an indication of a number of data samples and the second transmission rate.

In still another variation of this embodiment, the anchor may be a single anchor that is further configured to: define a two-dimensional plane within a zone containing the tag; calculate the AOA based on the signal data received from the tag; determine a vector from the AOA; and calculate a position of the tag based on an intersection of the vector with the two-dimensional plane.

In yet another variation of this embodiment, the second transmission rate may be a priority transmission rate; the first transmission rate may be a reduced transmission rate relative to the priority transmission rate; the first information may be priority information corresponding to the tag; the one or more first instances may be one or more priority instances; the first instance occurrence may be a priority instance occurrence; and the request may be a modified transmission rate request.

In another embodiment, the present invention is a method for tag polling. The method may comprise: receiving first information corresponding to a tag associated with an asset, the first information defining one or more first instances where an anchor causes the tag to transmit signal data at a first transmission rate; receiving, from the anchor, a tag listing that includes the tag; determining a first instance occurrence for the tag based on the first information; and transmitting a request that causes the anchor to adjust polling the tag from a second transmission rate to the first transmission rate.

In a variation of this embodiment, the method may further comprise: polling, by the anchor, the tag at the first transmission rate; determining an AOA based on a first set of signal data received from the tag at the first transmission rate; and transmitting the AOA to a server.

In another variation of this embodiment, the method may further comprise: receiving, at the tag, a polling request from the anchor indicating the first transmission rate; transmitting a first set of data packets to the anchor at the first transmission rate; and adjusting a data transmission rate from the first transmission rate to the second transmission rate in accordance with at least one of: (i) a timer exceeding a time threshold or (ii) receipt of a subsequent polling request indicating the reduced transmission rate.

In yet another variation of this embodiment, the first set of data packets may include a Bluetooth low energy (BLE) continuous tone extension (CTE) data packet.

In still another variation of this embodiment, the method may further comprise: polling proximate tags within a threshold distance from the anchor at the second transmission rate to receive a respective set of signal data from each proximate tag; and updating, by the anchor, the tag listing based on the respective set of signal data received from the proximate tags.

In yet another variation of this embodiment, the first transmission rate may be higher than the second transmission rate.

In still another variation of this embodiment, the first information may include at least one of: (i) a movement threshold, (ii) a scheduled first instance, or (iii) a position threshold.

In yet another variation of this embodiment, the request may include an indication of a number of data samples and the first transmission rate.

In still another variation of this embodiment, the anchor may be a single anchor, and the method may further comprise: defining a two-dimensional plane within a zone containing the tag; calculating, by the anchor, an AOA based on the signal data received from the tag; determining a vector from the AOA; and calculating a position of the tag based on an intersection of the vector with the two-dimensional plane.

In yet another embodiment, the present invention is a tangible machine-readable medium comprising instructions that, when executed, may cause a machine to at least: receive first information corresponding to a tag associated with an asset, the first information being indicative of one or more first instances where an anchor causes the tag to transmit signal data at a first transmission rate; receive a tag listing that includes the tag; determine a first instance occurrence for the tag based on the first information; and cause the anchor to adjust polling the tag from a second transmission rate to the first transmission rate.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
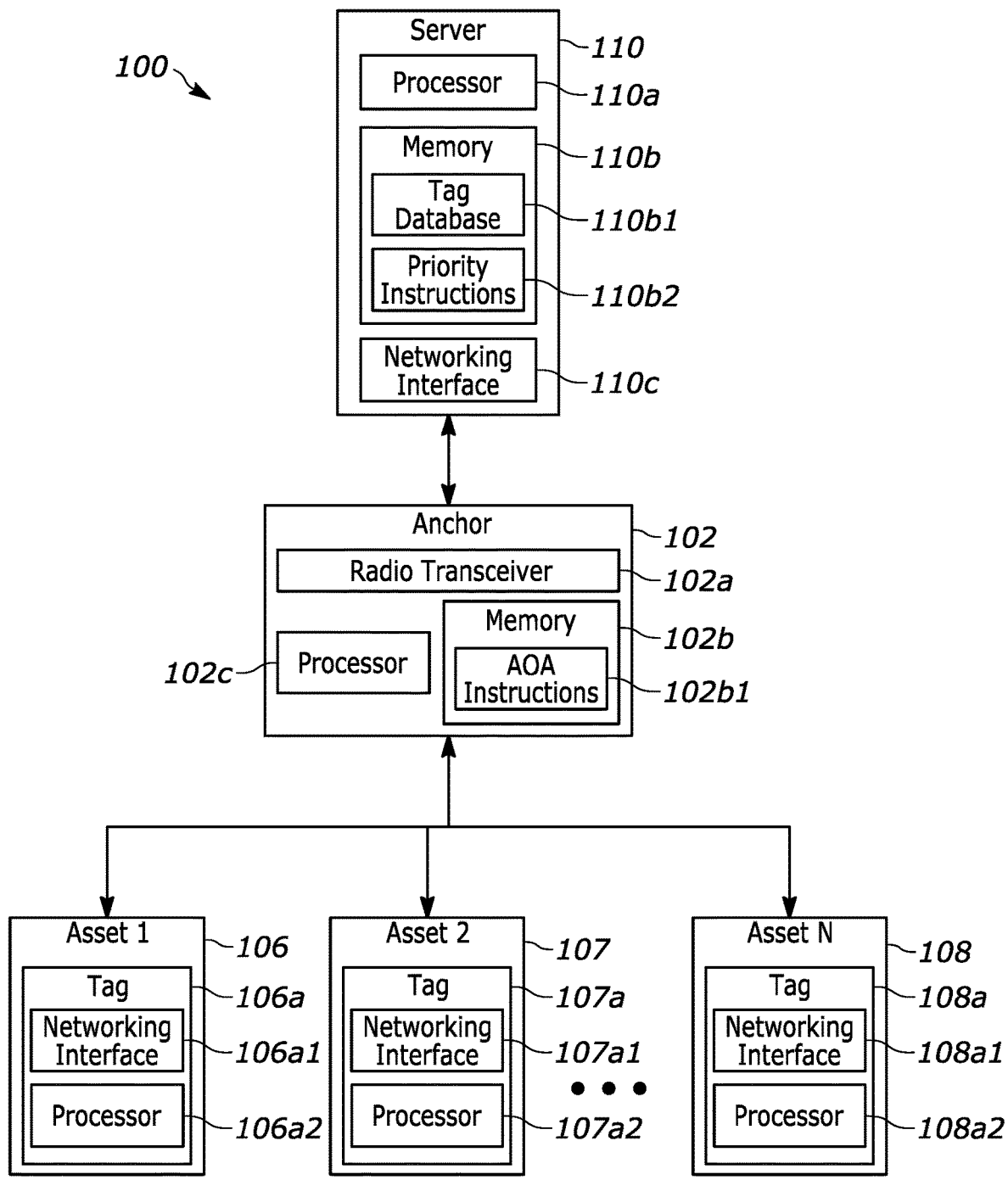
FIG. 1 depicts an example environment in which systems/devices for tag polling may be implemented, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, conventional locationing systems suffer from a general lack of flexibility, such that accurate locationing of assets during certain priority instances may not be possible. Many of these issues are the result of an inherent inverse relationship between tag sampling frequency and tag battery life. For example, a conventional tag may transfer data packets at a first/base transmission rate/frequency configured to preserve the tag's remaining battery life, and thereby enable the tag to function for a desired length of time. However, as previously mentioned, these first/base transmission rates/frequencies may be insufficient for conventional locationing systems to accurately determine the AOA of incoming data packets and/or to otherwise accurately determine the location of the asset corresponding to the tag. Increasing the transmission rate/frequency may increase the resulting accuracy of the determined AOA/location but necessarily decreases the battery life significantly faster. Thus, in general, conventional locationing systems struggle to perform locationing in a manner that is accurate and preserves the battery life of the tags.

Thus, it is an objective of the present disclosure to eliminate these and other problems with conventional locationing systems via systems and methods that may selectively cause tags to transmit data packets at a higher transmission rate when the assets associated with the tags are experiencing a priority instance/event. In particular, the systems and methods of the present disclosure alleviate the issues present with conventional systems/devices by performing selective higher-rate/frequency tag polling to ensure that the AOA/location of an asset is accurately determined during a priority instance. Of course, such increased tag polling may be performed for any suitable reason. Regardless, selectively increasing and decreasing tag polling rate/frequency enables the systems and methods of the present disclosure to accurately determine the AOA/location of an asset at any given time while also preserving the tag battery life in a manner that was previously unachievable using conventional techniques.

Thus, in accordance with the above, and with the disclosure herein, the present disclosure includes improvements in computer functionality or in improvements to other technologies at least because the present disclosure describes that, e.g., locationing systems, and their related various components, may be improved or enhanced with the disclosed tag polling systems and methods that provide more accurate and efficient locationing services for tags and corresponding assets. That is, the present disclosure describes improvements in the functioning of a locationing system itself or "any other technology or technical field" (e.g., the field of distributed/industrial locationing systems) because the disclosed tag polling systems and methods improve and enhance operation of locationing systems by introducing improved selective data transmission rates/frequencies to eliminate peak misidentification, erroneous AOA/location determinations, and other inefficiencies typically experienced over time by locationing systems lacking such tag polling systems and methods. This improves the state of the art at least because such previous locationing systems are inefficient and inaccurate as they lack the ability for selectively changing data transmission rates/frequencies.

In addition, the present disclosure includes applying various features and functionality, as described herein, with, or by use of, a particular machine, e.g., a tag, an anchor, a server, and/or other hardware components as described herein.

Moreover, the present disclosure includes specific features other than what is well-understood, routine, conventional activity in the field, or adding unconventional steps that demonstrate, in various embodiments, particular useful applications, e.g., receiving first information corresponding to a tag, the first information being indicative of one or more first instances where the anchor polls the tag at a second transmission rate that is different from the first transmission rate; receiving, from an anchor, a tag listing that includes the tag; determining a first instance occurrence for the tag based on the first information; and/or transmitting a request to the anchor that causes the anchor to poll the tag at the second transmission rate, among others.

Turning to the figures, FIG. 1 depicts an example environment 100 in which systems/devices for tag polling may be implemented, in accordance with embodiments described herein. The example environment 100 may comprise, include, and/or otherwise be a part of a networking environment in which the systems/devices of the present disclosure may operate. In the example embodiment of FIG. 1, the example environment 100 includes an anchor 102 that is communicatively coupled to a first tag 106a of a first asset 106, a second tag 107a of a second asset 107, a third tag 108a of an $N^{th}$ asset 108, and a server 110. Generally speaking, the anchor 102, the first tag 106a, the second tag 107a, the third tag 108a, and/or the server 110 may be capable of executing instructions to, for example, implement operations of the example methods described herein, as may be represented by the flowcharts of the drawings that accompany this description. Namely, the anchor 102 may be connected to the first tag 106a, the second tag 107a, the third tag 108a, and/or the server 110 across multiple communication channels, and may generally be configured to receive and process information received from the first tag 106a, the second tag 107a, the third tag 108a, and/or the server 110.

The server 110 may store a tag database 110b1 and a set of priority instructions 110b2. The tag database 110b1 may be or include a listing of tags (e.g., tag 106a, tag 107a, tag 108a) that are proximate to specific anchors (e.g., anchor 102) and/or otherwise transmit data to the particular anchor(s). More specifically, the tag database 110b1 listings may include identification information about each of the tags 106a, 107a, 108a and/or the assets 106, 107, 108 associated with the tags 106a, 107a, 108a, as well as location information (e.g., AOA) determined by the anchor 102. Of course, the tag database 110b1 may include any suitable information related to the tags and/or the assets associated with the tags.

To update the tag database 110b1, the server 110 may periodically request and/or otherwise receive updates from various anchors (e.g., anchor 102) disposed around an environment (e.g., example environment 100), and the server 110 may determine (via the one or more processors 110a) one or more tags indicated in the data received from the various anchors. The server 110 may then update the tag listing for each anchor by inputting each tag identified in the data received from the respective anchors into the corresponding tag listing of the tag database 110b1. For example, the tag database 110b1 may indicate at a first time that the anchor 102 received data from the first tag 106a and the second tag 107a. At a second time, the server 110 may transmit a request to the anchor 102 and/or may otherwise receive an update from the anchor 102 indicating that the anchor 102 received data from the first tag 106a, the second tag 107a, and the third tag 108a. Thus, the entries of the tag database 110b1 may indicate that the $N^{th}$ asset 108 moved into a receptive proximity of the anchor 102 at some point between the first time and the second time, such that the anchor 102 was able to receive data transmitted from the third tag 108a at the second time.

The server 110 may also include a set of priority instructions 110b2, which may indicate priority levels/values for each tag 106a, 107a, 108a. Additionally, or alternatively, the set of priority instructions 110b2 may indicate only those tags which have a set of predefined priority instances. These priority instances may correspond to circumstances where the server 110 may receive more frequent location updates for the particular tag to more accurately track the tag/asset's location. For example, a first priority instance for a first tag may correspond to a period of time (e.g., scheduled operation/procedure of a patient) when the first tag is scheduled to adjust the data packet transmission rate from a first transmission rate to a second transmission rate. In another example, a second priority instance for a second tag may correspond to one or more threshold values (e.g., location thresholds, movement thresholds, proximity thresholds) that, when exceeded/violated, may cause the second tag to adjust the data packet transmission rate from the first transmission rate to the second transmission rate.

Generally, each tag 106a, 107a, 108a may transmit data to the anchor 102 at a first transmission rate. This first transmission rate may be frequent enough to determine the approximate location of each corresponding asset 106, 107, 108 without substantially draining the battery life of the tags 106a, 107a, 108a. However, during a priority instance, the server 110 may transmit a request to the anchor 102 that is subsequently transmitted to the respective tags 106a, 107a, 108a, that causes the tags 106a, 107a, 108a to transmit data to the anchor 102 at a second transmission rate that may be higher/increased than the first transmission rate. For example, the first transmission rate may correspond to the tags transmitting data packets to the anchor 102 every second, several seconds, minutes, etc., and the second transmission rate may correspond to the tags transmitting data packets to the anchor 102 every millisecond, several milliseconds, etc. Such data packets may generally be or include identification information corresponding to the tags 106a, 107a, 108a and/or the associated assets 106, 107, 108, remaining battery life information, asset-specific data payloads, and/or any other suitable data or combinations thereof. Of course, it should be appreciated that the first transmission rate may be higher/lower than the second transmission rate. Moreover, in certain embodiments, data packets transmitted by any particular tag 106a, 107a, 108a during a priority instance and/or not during a priority instance may be or include a Bluetooth low energy (BLE) continuous tone extension (CTE) data packet.

As an exemplary priority instance, the first asset 106 may be a wristband attached to a hospital patient that is scheduled for a procedure at a first time. The priority instructions 110b2 may indicate this first time as a priority instance for the first tag 106a such that the first tag 106a should transmit data packets more frequently at the first time to ensure that the hospital patient's location may be tracked with a high degree of precision and accuracy. Thus, when the server 110 determines that the first time has been reached, the server 110 may access the tag database 110*b*1 to determine which anchor(s) (e.g., anchor 102) are proximate to the first tag 106*a* and may transmit a request to any such proximate anchor(s) to cause the first tag 106*a* to transmit data at an increased transmission rate.

Namely, the server 110 may transmit the request at the first time to the anchor 102 and the anchor 102 may then subsequently transmit a polling request to the first tag 106*a*. The polling request may include instructions and/or otherwise cause the first tag 106*a* to adjust the transmission rate of data packets to the anchor 102 from the first transmission rate to the second transmission rate. The first tag 106*a* may thereafter transmit data packets at the second transmission rate until the server 110 (and/or other suitable device) determines that a time threshold has been reached and/or until the first tag 106*a* receives a subsequent polling request indicating transitioning back to the first transmission rate.

Continuing the prior example, the priority instance corresponding to the hospital patient's procedure may have a predefined period, during which, the first tag 106*a* may be instructed to transmit data packets to proximate anchors (e.g., anchor 102) at the second transmission rate. This predefined period may begin at the first time, may end at a second time after the first time, and this predefined period may be stored as part of the priority instructions 110*b*2. In any event, the first tag 106*a* may begin transmitting data packets to the anchor 102 at the second transmission rate at the first time in response to receiving the polling request from the anchor 102. At the second time, the server 110 may determine that the predefined period corresponding to the priority instance of the first tag 106*a* has elapsed, and may transmit a second/subsequent request to an anchor (e.g., anchor 102) listed in the tag database 110*b*1 as having most recently received data packets from the first tag 106*a*. The anchor 102 may then transmit a subsequent polling request to the first tag 106*a* indicating that the first tag 106*a* should resume transmitting data packets to the anchor at the first transmission rate. Additionally, or alternatively, the first tag 106*a* may independently track the predefined period, may independently determine at the second time that the predefined period has elapsed, and may independently adjust the data transmission rate from the second transmission rate to the first transmission rate.

As part of these communications between the server 110 and the individual tags 106*a*, 107*a*, 108*a*, the anchor 102 may receive data from the server 110 and the tags 106*a*, 107*a*, 108*a*, and may transmit communications based on that received data to the server 110 and/or the tags 106*a*, 107*a*, 108*a*. Broadly speaking, the anchor 102 may be configured to transmit and receive data to/from the server 110 and nearby tags (e.g., the first tag 106*a*, the second tag 107*a*, the third tag 108*a*). In certain embodiments, the anchor 102 may be a hybrid Bluetooth® low energy (BLE) device that communicates with some/all of the devices in the environment 100 via BLE. In some embodiments, the anchor 102 may be a device that executes and/or conforms to any suitable software operating system (e.g., Android, IOS), a custom Internet of Things (IoT) bridge device with a BLE radio, and/or any other suitable device or combination thereof.

Namely, the anchor 102 may be configured to periodically listen for data packets from nearby tags (e.g., tags 106*a*, 107*a*, 108*a*), transmit the data packets and/or data obtained therein to the server 110, and/or broadcast requests received from the server 110 to such nearby tags. As an example, the anchor 102 may receive requests from the server 110, and may subsequently transmit requests to proximate tags 106*a*, 107*a*, 108*a* based on the requests. Such requests from the server 110 may be or include instructions causing the tags 106*a*, 107*a*, 108*a* to adjust the transmission rate of data packets to the anchor 102, transmit identification data to the anchor, and/or other suitable instructions or combinations thereof.

The anchor 102 may also transmit and receive data (e.g., data packets) to/from any of the tags 106*a*, 107*a*, 108*a* and to calculate an AOA based on the data received from those tags 106*a*, 107*a*, 108*a* by executing the AOA instructions 102*b*1 stored in memory 102*b*. The anchor 102 may then transmit these AOAs, along with some/all of the received data from the tags 106*a*, 107*a*, 108*a*, to the server 110 for tracking and/or otherwise notifying a user (e.g., locationing system administrator) of a location/position of an asset 106, 107, 108 associated with the tags 106*a*, 107*a*, 108*a*.

Generally, the AOA instructions 102*b*1 may be or include instructions enabling the processors 102*c* of the anchor 102 to determine the AOA of data packets received from any individual tag 106*a*, 107*a*, 108*a*. In particular, and as described herein, the AOA instructions 102*b*1 may enable the anchor 102 to define a two-dimensional plane within a zone containing any particular tag 106*a*, 107*a*, 108*a*, calculate the AOA of the tag's data packets, determine a vector corresponding to the AOA, and calculate the position of the associated tag based on an intersection of the vector with the two-dimensional plane.

The anchor 102 may also include a radio transceiver 102*a* configured to transmit/receive data streams to/from various devices of the example environment 100, such as the server 110 and the tags 106*a*, 107*a*, 108*a*. The radio transceiver 102*a* may include an antenna with an associated gain profile corresponding to the transceiver's 102*a* antenna converting input power into radio waves (e.g., transmission) and/or received radio waves into electrical power (e.g., receiving).

The assets 106, 107, 108 may generally be any device, component, or object that an entity may desire to track and/or otherwise locate. For example, the assets 106, 107, 108 may be large and calibrated tools used in and/or for oil and gas equipment/operations, parcels for delivery by a shipping company, hospital equipment that is and/or may be moved to different floors/rooms, wristbands attached to hospital patients, and/or any other suitable objects or combinations thereof. While illustrated as three assets 106, 107, 108, it should be appreciated that the anchor 102 may simultaneously communicate with any suitable number of assets 106, 107, 108 via the associated tags 106*a*, 107*a*, 108*a*. Thus, the $N^{th}$ asset 108 may be a third asset, a fifth asset, a twentieth asset, a one-hundredth asset, and/or any other integer value asset.

Each asset 106, 107, 108 may also include a corresponding tag 106*a*, 107*a*, 108*a* that may be configured to transmit information associated with the asset via the networking interface 106*a*1, 107*a*1, 108*a*1 to, for example, the anchor 102. Each asset tag 106*a*, 107*a*, 108*a* may also include one or more processors 106*a*2, 107*a*2, 108*a*2 configured to interpret and/or execute instructions contained in signal received from the anchor 102, server 110, and/or other suitable device(s). For example, the processors 106*a*2, 107*a*2, 108*a*2 may be configured to interpret polling requests received from the anchor 102 and thereby adjust the transmission rate for data packets from a first transmission rate to a second transmission rate and/or from the second transmission rate to the first transmission rate.

Moreover, in certain embodiments, a workstation (not shown) may be communicatively connected to the server 110, and a user/operator may access the server 110 to retrieve a location associated with an asset 106, 107, 108. The workstation may query the server 110 with the identification tag of the corresponding asset 106, 107, 108, and the server 110 may match the identification tag with a location entry in the tag database 110b1 associated with the corresponding asset 106, 107, 108. The server 110 may then forward the location entry to the workstation for viewing by the user/operator.

More generally, the one or more memories 102b, 110b may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., priority instructions 110b2, AOA instructions 102b1, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 102c, 110a (e.g., working in connection with a respective operating system in the one or more memories 102b, 110b) to facilitate, implement, or perform the machine readable instructions, methods, processes, elements or limitations, as illustrated, depicted, or described for the various flowcharts, illustrations, diagrams, figures, and/or other disclosure herein.

In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.). Moreover, the one or more memories 102b, 110b may also store machine readable instructions, including any of one or more application(s), one or more software component(s), and/or one or more APIs, which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein.

The one or more processors 102c, 110a may be connected to the one or more memories 102b, 110b via a computer bus (not shown) responsible for transmitting electronic data, data packets, or otherwise electronic signals to and from the one or more processors 102c, 110a and one or more memories 102b, 110b to implement or perform the machine readable instructions, methods, processes, elements or limitations, as illustrated, depicted, or described for the various flowcharts, illustrations, diagrams, figures, and/or other disclosure herein.

The one or more processors 102c, 110a may interface with the one or more memories 102b, 110b via the computer bus to execute any suitable application or executable instructions (e.g., priority instructions 110b2, AOA instructions 102b2) necessary to perform any of the actions associated with the methods of the present disclosure. The one or more processors 102c, 110a may also interface with the one or more memories 102b, 110b via the computer bus to create, read, update, delete, or otherwise access or interact with the data stored in the one or more memories 102b, 110b and/or external databases (e.g., a relational database, such as Oracle, DB2, MySQL, or a NoSQL based database, such as MongoDB). The data stored in the one or more memories 102b, 110b and/or an external database may include all or part of any of the data or information described herein, including, for example, asset tag 106a, 107a, 108a data packets, asset location data, AOA data, and/or other suitable information or combinations thereof.

The radio transceiver 102a and the networking interfaces 106a1, 107a1, 108a1 may be configured to communicate (e.g., send and receive) data via one or more external/network port(s) to one or more networks or local terminals, as described herein. In some embodiments, radio transceiver 102a and/or the networking interfaces 106a1, 107a1, 108a1 may include a client-server platform technology such as ASP.NET, Java J2EE, Ruby on Rails, Node.js, a web service or online API, responsive for receiving and responding to electronic requests. The radio transceiver 102a and/or the networking interfaces 106a1, 107a1, 108a1 may implement the client-server platform technology that may interact, via the computer bus, with the one or more memories 102b, 110b (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the radio transceiver 102a and the networking interfaces 106a1, 107a1, 108a1 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to a network. In some embodiments, the network (not shown) may comprise a private network or local area network (LAN). Additionally, or alternatively, the network may comprise a public network such as the Internet. In some embodiments, the network may comprise routers, wireless switches, or other such wireless connection points communicating to anchor 102 (via the radio transceiver 102a), the first asset 106 (via networking interface 106a1), the second asset (via networking interface 107a1), the third asset (via networking interface 108a1), and/or the server 110 (via networking interface 110c) via wireless communications based on any one or more of various wireless standards, including by non-limiting example, a BLUETOOTH standard (e.g., BLE), IEEE 802.11a/b/c/g (WIFI), or the like.

Figure 2A:
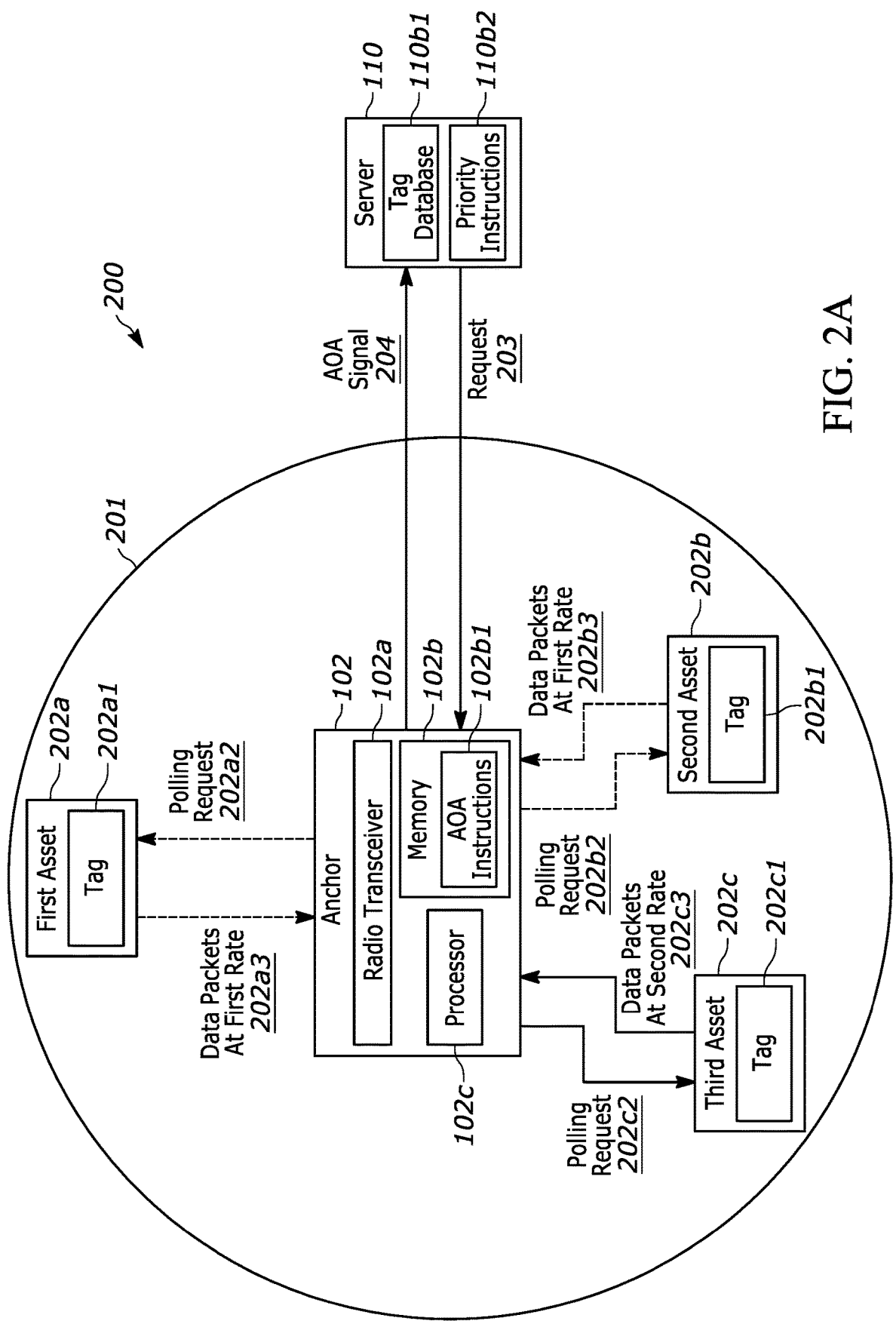
FIG. 2A depicts a server transmitting a request to an anchor that causes the anchor to change the polling transmission rate of a tag associated with an asset, in accordance with embodiments described herein.

To illustrate a scenario where a server, anchor, and asset tag(s) may transmit and/or receive data packets at various transmission rates based on priority instances, FIG. 2A depicts a server transmitting a request to an anchor that causes the anchor to change the polling transmission rate of a tag associated with an asset, in accordance with embodiments described herein. In particular, the example scenario 200 illustrated in FIG. 2A depicts the server 110 transmitting a request 203 to the anchor 102, the anchor 102 transmitting polling requests 202a2, 202b2, 202c2 to each of the tags 202a1, 202b1, 202c1 associated with the proximate assets 202a, 202b, 202c, the tags 202a1, 202b1, 202c1 transmitting data packets to the anchor 102 at a specified transmission rate, and the anchor 102 transmitting an AOA signal 204 to the server 110. As referenced herein, the assets 202a, 202b, 202c may be "proximate assets" because each asset 202a, 202b, 202c is located within a transmission range 201 of the anchor 102. Thus, each proximate asset 202a, 202b, 202c (and the corresponding tags 202a1, 202b1, 202c1) may be physically close enough to the anchor 102 to receive and transmit signals (e.g., polling requests, data packets) to/from the anchor 102.

In any event, as illustrated in FIG. 2A, the anchor 102 has three assets 202a, 202b, 202c within transmission range 201 of the anchor 102, such that the anchor 102 may transmit/receive data from the respective asset tags 202a1, 202b1, 202c1. In particular, the anchor 102 may receive a request 203 from the server 110, and the request 203 may be or include instructions that cause the anchor 102 to transmit polling requests 202a2, 202b2, 202c2 to the asset tags 202a1, 202b1, 202c1. The request 203 may more specifically include instructions that identify one or more of the asset tags 202a1, 202b1, 202c1 which should adjust their transmission rates for data packets, and the request 203 may also specify a number of data packets (i.e., samples) to be collected from any particular tag 202a1, 202b1, 202c1 as well as an adjusted (second) transmission rate. Accordingly, the anchor 102 may transmit the polling requests 202a2, 202b2, 202c2 to the respective asset tags 202a1, 202b1, 202c1 based on the specific tags identified in the request 203 and/or may transmit polling requests 202a2, 202b2, 202c2 to all proximate assets tags 202a1, 202b1, 202c1. When the anchor 102 transmits polling requests 202a2, 202b2, 202c2 to all proximate assets tags 202a1, 202b1, 202c1, the proximate asset tags 202a1, 202b1, 202c1 may then independently analyze the polling requests 202a2, 202b2, 202c2 to determine whether each asset tag 202a1, 202b1, 202c1 should adjust the data packet transmission rate.

For example, the request 203 transmitted from the server 110 may indicate that the third asset 202c tag 202c1 has a corresponding priority instance and should adjust the data packet transmission rate from a first transmission rate to a second transmission rate. The anchor 102 may then transmit the polling request 202c2 to the third asset 202c tag 202c1, wherein the tag 202c1 may adjust the transmission rate of data packets transmitted to the anchor 102 from the first transmission rate to the second transmission rate for the duration of the priority instance. Optionally, the anchor 102 may transmit similar polling requests 202a2, 202b2 to the tags 202a1, 202b1, and the tags 202a1, 202b1 may interpret the polling requests 202a2, 202b2, determine that the polling requests 202a2, 202b2 do not indicate the tags 202a1, 202b1 should adjust their data packet transmission rates, and may continue to transmit data packets to the anchor 102 at the first transmission rate 202a3, 202b3.

More specifically in the prior example, the anchor 102 may be located in a first hospital room, the first asset 322a may be a piece of medical equipment located in the first hospital room, the second asset 322b may be another piece of medical equipment assigned to the first hospital room, and the third asset 202c may be a wristband of a patient currently located in the first hospital room. The third asset 202c, and by association the third tag 202c1, may have a set of priority instructions 110b2 stored in the server 110 indicating that the third asset 202c may experience a priority instance at a first time corresponding to a beginning period of physical therapy for the patient in the first hospital room. Prior to the first time, each of the first asset 202a tag 202a1, the second asset 202b tag 202b1, and the third asset 202c tag 202c1 may periodically transmit data packets to the anchor 102 at the first transmission rate. When the server 110 determines that the first time has arrived, the server 110 may transmit the request 203 to the anchor 102, and the anchor 102 may transmit the polling request 202c2 to the third asset 202c tag 202c1. The tag 202c1 may adjust the data packet transmission rate from the first transmission rate to the second transmission rate and may subsequently begin transmitting data packets at the second transmission rate 202c3 while the patient receives physical therapy. Meanwhile, the tag 202a1 and/or the tag 202b1 may continue transmitting data packets to the anchor 102 at the first transmission rate 202a3, 202b3.

When the scheduled period for physical therapy elapses and/or a user indicates that the patient's physical therapy has concluded, the tag 202c1 may resume transmitting data packets at the first transmission rate. The server 110 may transmit a subsequent request indicating that the tag 202c1 should re-adjust the data packet transmission rate from the second transmission rate to the first transmission rate. Additionally, or alternatively, the tag 202c1 may independently determine that the scheduled period corresponding to the priority instance has elapsed and may re-adjust the data packet transmission rate from the first transmission rate to the second transmission rate.

Thus, as illustrated in the prior examples, the anchor 102 and the server 110 may receive data packets from the third asset 202c tag 202c1 at an increased transmission rate relative to the data packets received from the tags 202a1, 202b1 during the priority instance of the third asset 202c tag 202c1. The anchor 102 may determine an AOA using the received data packets from the third asset 202c tag 202c1 based on the AOA instructions 102b1, and may then transmit an AOA signal 204 to the server 110. During the priority instance corresponding to the third asset 202c, the anchor 102 may receive more data packets from the third asset 202c tag 202c1 than from the other asset tags 202a1, 202b1 transmitting data packets at the first transmission rate, and may thereby transmit AOA signals 204 that may include AOAs corresponding only to the third asset 202c. Regardless, during the priority instance corresponding to the third asset 202c and/or at times other than such a priority instance, the AOA signals 204 may include AOAs corresponding to any combination of the proximate assets 202a, 202b, 202c.

Upon receipt of such AOA signals 204, the server 110 may interpret and/or otherwise determine the location of the assets 202a, 202b, 202c indicated in the AOA signals 204 and store such locations in the tag database 110b1. Thus, during a priority instance of a particular asset (e.g., third asset 202c), the server 110 may receive AOA signals 204 from the anchor 102 corresponding to the particular asset at an increased rate relative to the other assets (e.g., first asset 202a, second asset 202b) that are proximate to the anchor 102. Accordingly, the server 110 may store more asset locations in the tag database 110b1 for the particular asset experiencing the priority instance during the priority instance than the other assets proximate to the anchor 102 during the priority instance. In this manner, the tag database 110b1 may precisely and accurately track the location of the particular asset during the priority instance by recording an increased number of asset locations for the duration of the priority instance. When the priority instance ends, the server 110, anchor 102, and/or the particular tag 202a1, 202b1, 202c1 may decrease the data packet transmission rate of the particular tag 202a1, 202b1, 202c1 and thereby preserve the remaining battery life of the particular tag 202a1, 202b1, 202c1.

As another example, the third asset 202c may be a first piece of medical equipment that is kept in a first hospital room along with the first asset 202a and the second asset 202b. The server 110 may store instructions in the priority instructions 110b2 indicating that the third asset 202c should always remain within he first hospital room, and that the third asset 202c leaving the first hospital room constitutes a priority instance. In this example, at a first time, the server 110 may receive an AOA signal 204 from the anchor 102 indicating that the third asset 202*c* is no longer located within the first hospital room, and the server 110 may then determine that the third asset 202*c* is experiencing a priority instance. Thus, the server 110 may transmit a request 203 indicating that the third asset 202*c* tag 202*c*1 should adjust the data packet transmission rate from a first transmission rate to a second transmission rate. In this example, the third asset 202*c* tag 202*c*1 may continue transmitting data packets at the second transmission rate until the server 110 determines that the third asset 202*c* returns to the first hospital room. When the server 110 receives an AOA signal 204 from the anchor 102 indicating that the third asset 202*c* has entered the first hospital room, then the server 110 may transmit a subsequent request indicating that the third asset 202*c* tag 202*c*1 may re-adjust the data packet transmission rate from the second transmission rate to the first transmission rate.

In any event, when the server 110 updates/stores the location data from the tag 202*c*1, the server 110 may transmit an alert to a workstation (not shown) indicating that the third asset 202*c* is experiencing a priority instance. Thus, a user/operator using the workstation may view the alert and proceed to take an appropriate action in the event that the priority instance requires intervention from the user (e.g., moving the third asset 202*c* back to within threshold location/proximity values). Additionally, or alternatively, the workstation may query the tag database 110*b*1 to identify a suitable user device (e.g., mobile device) that is located proximate to the third asset 202*c* and push an alert to the user device regarding the erroneously placed third asset 202*c*.

Figure 2B:
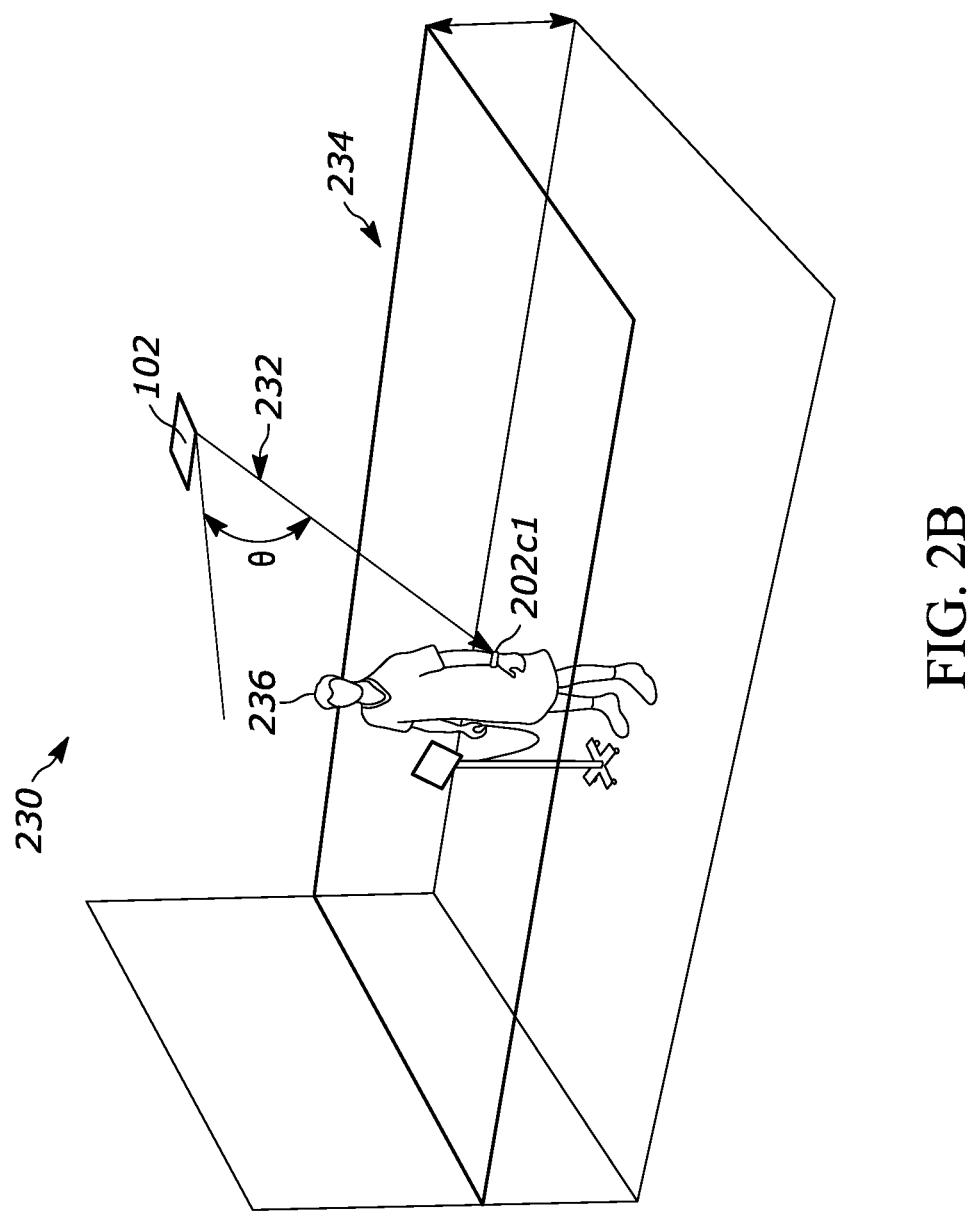
FIG. 2B depicts an AOA determination process for signals from asset tags performed by an anchor, in accordance with embodiments described herein.

To provide a better understanding of the location determination performed by the anchor 102 and server 110, FIG. 2B depicts an AOA and tag location determination process for signals from asset tags performed by an anchor, in accordance with embodiments described herein. As illustrated in FIG. 2B, a patient 236 may wear a wristband with a tag 202*c*1 that periodically transmits data packets to the anchor 102. Each of these data packets may arrive at the anchor 102 at a certain angle θ. The anchor 102 may receive data packets from the tag 202*c*1, and may determine the AOA O based on the signal properties of the received data packets.

With the determined AOA O, the anchor 102 may then proceed to determine the position of the tag 202*c*1. In particular, the anchor 102 may define a two-dimensional plane 234 within a zone 230 containing the tag 202*c*1. The two-dimensional plane 234 may generally be positioned at a lateral (i.e., vertical) position within the zone 230 sufficient to ensure that an intersection of the plane 234 with a vector 232 generated in the direction of the AOA O would indicate the presence of the patient 236 within the zone 230. Accordingly, the anchor 102 may determine a vector from the AOA O and may calculate a position of the tag 202*c*1 based on an intersection of the vector 232 with the two-dimensional plane 234.

In this manner, the anchor 102 may independently and accurately determine a location of the tag 202*c*1 without requiring any additional hardware or anchors. For example, if the vector 232 intersects the two-dimensional plane 234 at a position known to exceed the boundaries of a particular room included in the zone 230, then the anchor 102 may determine that the asset (e.g., patient 236) has left the room. Thus, the AOA and tag location determination process illustrated in FIG. 2B enables the single anchor 102 to determine the tag 202*c*1 data packet AOA O and the tag 202*c*1 location with significant accuracy and precision to a degree that was previously unachievable using conventional techniques.

Figure 3:
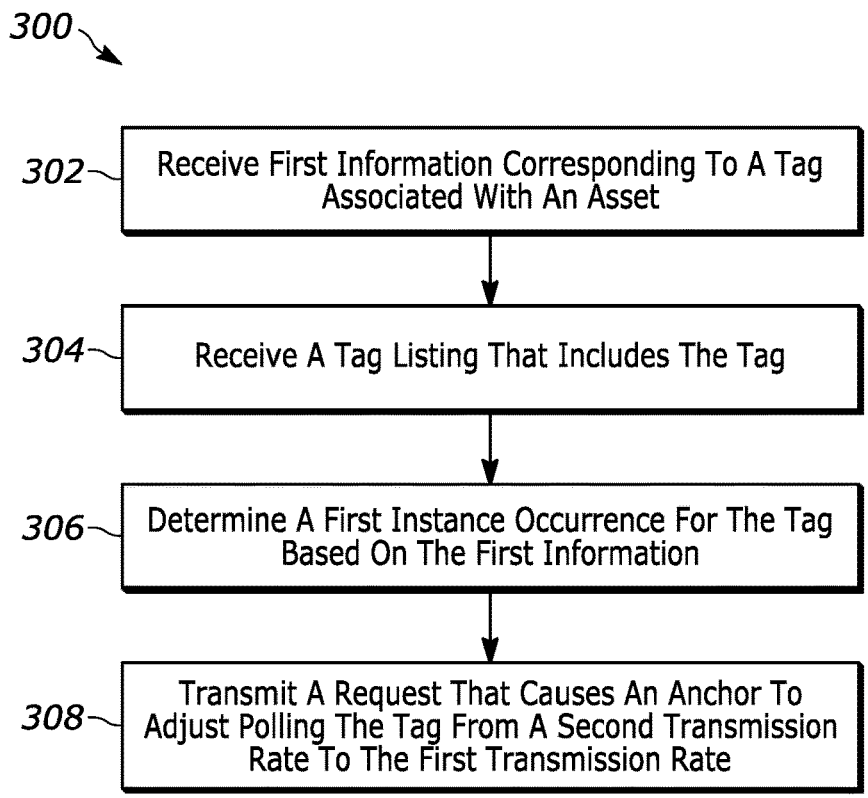
FIG. 3 is a flowchart representative of a method for tag polling, in accordance with embodiments described herein.

FIG. 3 is a flowchart representative of a method 300 for tag polling, in accordance with embodiments described herein. Generally, and as described herein, the method 300 for tag polling may cause the server 110, anchor 102, and/or any tags (e.g., tags 106*a*1, 107*a*1, 108*a*1, 202*a*1, 202*b*1, 202*c*1) to transmit packet data corresponding to high priority assets at selectively increased transmission rates in response to detecting and/or otherwise determining that an asset associated with a tag is experiencing a priority instance. More specifically, the method 300 enables the server 110, the anchor 102, and the tags (e.g., tags 106*a*1, 107*a*1, 108*a*1, 202*a*1, 202*b*1, 202*c*1) to enhance/improve the speed, efficiency, and reliability of asset locationing/tracking by selectively increasing the data packet transmission rates of tags associated with assets experiencing priority instances, as described herein. It is to be understood that any of the steps of the method 300 may be performed by, for example, the server 110, the anchor 102, tags (e.g., tags 106*a*1, 107*a*1, 108*a*1, 202*a*1, 202*b*1, 202*c*1), and/or any other suitable components or combinations thereof discussed herein.

At block 302, the method 300 receiving first information corresponding to a tag associated with an asset. The first information may define one or more first instances (e.g., priority instances) where an anchor causes the tag to transmit signal data at a first transmission rate. The method 300 may further include receiving, from an anchor, a tag listing that includes the tag (block 304). The method 300 may further include determining a first instance occurrence for the tag based on the first information (block 306). The method 300 may further include transmitting a request that causes the anchor to adjust polling the tag from a second transmission rate to the first transmission rate (block 308).

In certain embodiments, the method 300 may further include: polling, by the anchor, the tag at the first transmission rate; determining an AOA based on a first set of signal data received from the tag at the first transmission rate; and transmitting the AOA to a server.

In some embodiments, the method 300 may further include: receiving, at the tag, a polling request from the anchor indicating the first transmission rate; transmitting a first set of data packets to the anchor at the first transmission rate; and adjusting a data transmission rate from the first transmission rate to the second transmission rate in accordance with at least one of: (i) a timer exceeding a time threshold or (ii) receipt of a subsequent polling request indicating the reduced transmission rate.

In certain embodiments, the AOA determined by the anchor and/or the first set of data packets may include a Bluetooth low energy (BLE) continuous tone extension (CTE) data packet.

In some embodiments, the method 300 may further include: polling proximate tags within a threshold distance from the anchor at the second transmission rate to receive a respective set of signal data from each proximate tag; and updating, by the anchor, the tag listing based on the respective set of signal data received from the proximate tags.

In certain embodiments, the first transmission rate may be higher than the second transmission rate.

In some embodiments, the first information may include at least one of: (i) a movement threshold, (ii) a scheduled first instance, or (iii) a position threshold.

In certain embodiments, the request may include an indication of a number of data samples and the first transmission rate.

In some embodiments, the anchor may be a single anchor, and the method 300 may further include: defining a two-dimensional plane within a zone containing the tag; calculating, by the anchor, an AOA based on the signal data received from the tag; determining a vector from the AOA; and calculating a position of the tag based on an intersection of the vector with the two-dimensional plane.

Of course, it is to be appreciated that the actions of the method 300 may be performed in any suitable order and any suitable number of times.

Figure 4:
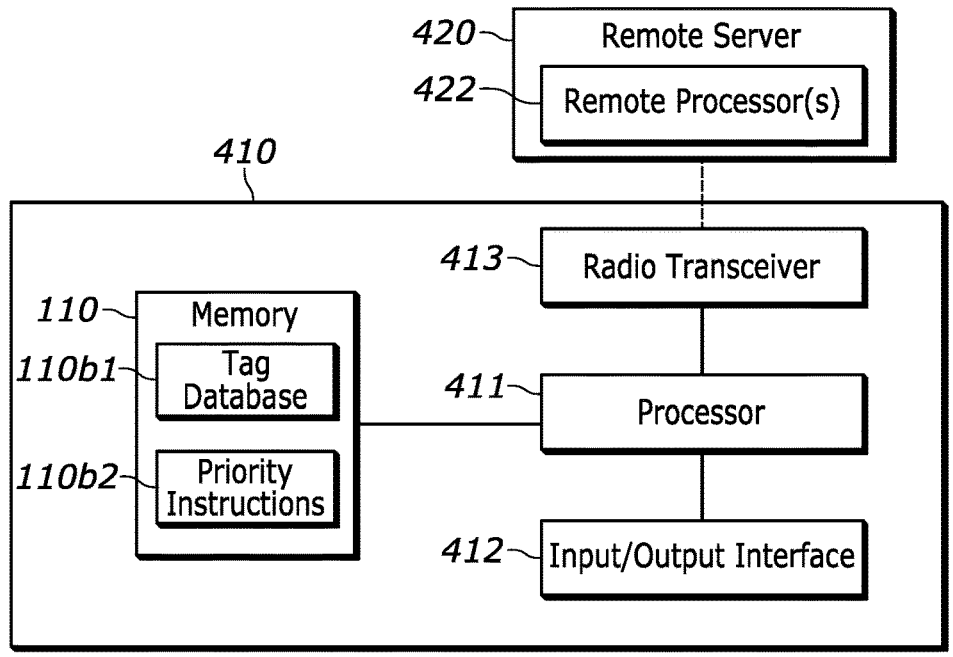
FIG. 4 is a block diagram of an example logic circuit for implementing example methods and/or operations described herein.

FIG. 4 is a block diagram representative of an example logic circuit capable of implementing example methods and/or operations described herein. As an example, the example logic circuit may be capable of implementing one or more components of the server 110 of FIG. 1. Of course, it should be understood that the example logic circuit may also include and/or otherwise access instructions and/or components of other components represented in FIG. 1 and/or elsewhere herein, such as the anchor 102, tags (e.g., tags 106a1, 107a1, 108a1, 202a1, 202b1, 202c1) and the like.

The example logic circuit of FIG. 4 is a processing platform 410 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 410 of FIG. 4 includes a processor 411 such as, for example, one or more microprocessors, controllers, and/or any suitable type of processor. The example processing platform 410 of FIG. 4 includes memory (e.g., volatile memory, non-volatile memory) 110 accessible by the processor 411 (e.g., via a memory controller). The example processor 411 interacts with the memory 110 to obtain, for example, machine-readable instructions stored in the memory 110 corresponding to, for example, the operations represented by the flowcharts of this disclosure. The memory 110 also includes the tag database 110b1 and the priority instructions 110b2 that are accessible by the example processor 411.

The priority instructions 110b2 may comprise rule-based instructions configured to, for example, cause the example processor 411 determine when a particular asset tag has violated/exceeded or satisfied certain predetermined thresholds (e.g., timing thresholds, location/proximity thresholds, etc.) and is therefore experiencing a priority instance. The priority instructions 110b2 may further comprise rule-based instructions configured to, for example, cause the example processor 411 to construct requests (e.g., request 203) in conformance with a specific data packet configuration configured to cause asset tags to adjust data packet transmission rates from a first transmission rate to a second transmission rate when the corresponding assets are experiencing a priority instance.

To illustrate, the example processor 411 may access the memory 110 to execute, reference, and/or otherwise interpret the tag database 110b1 and/or the priority instructions 110b2 when the AOA signals from an anchor indicate and/or the priority instructions 110b2 otherwise indicate that an asset is experiencing a priority instance. Additionally, or alternatively, machine-readable instructions corresponding to the example operations described herein may be stored on one or more removable media (e.g., a compact disc, a digital versatile disc, removable flash memory, etc.) that may be coupled to the processing platform 410 to provide access to the machine-readable instructions stored thereon.

The example processing platform 410 of FIG. 4 also includes a radio transceiver 413 to enable communication with other machines via, for example, one or more networks. The example radio transceiver 413 includes any suitable type of communication interface(s) (e.g., wired and/or wireless interfaces) configured to operate in accordance with any suitable protocol(s) (e.g., Ethernet for wired communications, and/or BLE or IEEE 802.11 for wireless communications).

The example processing platform 410 of FIG. 4 also includes input/output (I/O) interfaces 412 to enable receipt of user input and communication of output data to the user. Such user input and communication may include, for example, any number of keyboards, mice, USB drives, optical drives, screens, touchscreens, etc.

Further, the example processing platform 410 may be connected to a remote server 420. The remote server 420 may include one or more remote processors 422, and may be configured to execute instructions to, for example, implement operations of the example methods described herein, as may be represented by the flowcharts of the drawings that accompany this description.

ADDITIONAL CONSIDERATIONS

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system for tag polling, the system comprising:

a tag associated with an asset;

an anchor configured to poll the tag at a first transmission rate and determine an angle-of-arrival (AOA) based on signal data received from the tag; and a server communicatively coupled with the anchor, the server being configured to:

receive first information corresponding to the tag, the first information being indicative of one or more first instances where the anchor polls the tag at a second transmission rate that is different from the first transmission rate, receive, from the anchor, a tag listing that includes the tag, determine a first instance occurrence for the tag based on the first information, and transmit a request to the anchor that causes the anchor to poll the tag at the second transmission rate.

2. The system of claim 1, wherein the anchor is further configured to:
   receive the request;
   poll the tag at the second transmission rate;
   determine the AOA based on a first set of signal data received from the tag at the second transmission rate; and
   transmit the AOA to the server.

3. The system of claim 1, wherein the tag is configured to:
   receive a polling request from the anchor indicating the second transmission rate;
   transmit a first set of data packets to the anchor at the second transmission rate; and
   adjust a data transmission rate from the second transmission rate to the first transmission rate in accordance with at least one of: (i) a timer exceeding a time threshold or (ii) receipt of a subsequent polling request indicating the first transmission rate.

4. The system of claim 1, wherein the AOA includes a Bluetooth low energy (BLE) continuous tone extension (CTE) data packet.

5. The system of claim 1, wherein the anchor is further configured to:
   poll proximate tags within a threshold distance from the anchor at the first transmission rate to receive a respective set of signal data from each proximate tag; and
   update the tag listing based on the respective set of signal data received from the proximate tags.

6. The system of claim 1, wherein the second transmission rate is higher than the first transmission rate.

7. The system of claim 1, wherein the first information includes at least one of: (i) a movement threshold, (ii) a scheduled first instance, or (iii) a position threshold.

8. The system of claim 1, wherein the request includes an indication of a number of data samples and the second transmission rate.

9. The system of claim 1, wherein the anchor is a single anchor that is further configured to:
   define a two-dimensional plane within a zone containing the tag;
   calculate the AOA based on the signal data received from the tag;
   determine a vector from the AOA; and
   calculate a position of the tag based on an intersection of the vector with the two-dimensional plane.

10. The system of claim 1, wherein:
    the second transmission rate is a priority transmission rate;
    the first transmission rate is a reduced transmission rate relative to the priority transmission rate;
    the first information is priority information corresponding to the tag;
    the one or more first instances are one or more priority instances;
    the first instance occurrence is a priority instance occurrence; and
    the request is a modified transmission rate request.

11. A method for tag polling, the method comprising:
    receiving first information corresponding to a tag associated with an asset, the first information defining one or more first instances where an anchor causes the tag to transmit signal data at a first transmission rate;
    receiving, from the anchor, a tag listing that includes the tag;
    determining a first instance occurrence for the tag based on the first information; and
    transmitting a request that causes the anchor to adjust polling the tag from a second transmission rate to the first transmission rate.

12. The method of claim 11, further comprising:
    polling, by the anchor, the tag at the first transmission rate;
    determining an AOA based on a first set of signal data received from the tag at the first transmission rate; and
    transmitting the AOA to a server.

13. The method of claim 11, further comprising:
    receiving, at the tag, a polling request from the anchor indicating the first transmission rate;
    transmitting a first set of data packets to the anchor at the first transmission rate; and
    adjusting a data transmission rate from the first transmission rate to the second transmission rate in accordance with at least one of: (i) a timer exceeding a time threshold or (ii) receipt of a subsequent polling request indicating the reduced transmission rate.

14. The method of claim 13, wherein the first set of data packets includes a Bluetooth low energy (BLE) continuous tone extension (CTE) data packet.

15. The method of claim 11, further comprising:
    polling proximate tags within a threshold distance from the anchor at the second transmission rate to receive a respective set of signal data from each proximate tag; and
    updating, by the anchor, the tag listing based on the respective set of signal data received from the proximate tags.

16. The method of claim 11, wherein the first transmission rate is higher than the second transmission rate.

17. The method of claim 11, wherein the first information includes at least one of: (i) a movement threshold, (ii) a scheduled first instance, or (iii) a position threshold.

18. The method of claim 11, wherein the request includes an indication of a number of data samples and the first transmission rate.

19. The method of claim 11, wherein the anchor is a single anchor, and the method further comprises:
    defining a two-dimensional plane within a zone containing the tag;
    calculating, by the anchor, an AOA based on the signal data received from the tag;
    determining a vector from the AOA; and
    calculating a position of the tag based on an intersection of the vector with the two-dimensional plane.

20. A non-transitory machine-readable medium comprising instructions that, when executed, cause a machine to at least:
    receive first information corresponding to a tag associated with an asset, the first information being indicative of one or more first instances where an anchor causes the tag to transmit signal data at a first transmission rate;
    receive a tag listing that includes the tag;
    determine a first instance occurrence for the tag based on the first information; and
    cause the anchor to adjust polling the tag from a second transmission rate to the first transmission rate.

* * * * *